(12) United States Patent
Diehl et al.

(10) Patent No.: US 10,239,392 B2
(45) Date of Patent: Mar. 26, 2019

(54) ARRANGEMENT OF A COVER OF A FOLDING-TOP COMPARTMENT IN A CABRIOLET

(71) Applicant: Dr. Ing. h.c.F. Porsche Aktiengesellschaft, Stuttgart (DE)

(72) Inventors: Samuel Diehl, Jettingen (DE); Timo Czechtizky, Zell unter Aichelberg (DE); Mathias Froeschle, Ostfildern (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 15/899,896

(22) Filed: Feb. 20, 2018

(65) Prior Publication Data

US 2018/0201103 A1 Jul. 19, 2018

Related U.S. Application Data

(63) Continuation-in-part of application No. 14/810,666, filed on Jul. 28, 2015.

(30) Foreign Application Priority Data

Jul. 30, 2014 (DE) .......................... 10 2014 110 828

(51) Int. Cl.
*B60J 7/20* (2006.01)
*B60J 7/06* (2006.01)
(Continued)

(52) U.S. Cl.
CPC ............. *B60J 7/064* (2013.01); *B60J 7/1265* (2013.01); *B60J 7/1855* (2013.01); *B60J 7/198* (2013.01); *B60J 7/202* (2013.01)

(58) Field of Classification Search
CPC .................................... B60J 7/202; B60J 7/20
(Continued)

(56) References Cited

U.S. PATENT DOCUMENTS 2,686,076 A * 8/1954 Helser .................. B60N 2/3011
296/63
2,992,042 A * 7/1961 Gilson ..................... B60J 7/202
296/136.06
(Continued)

FOREIGN PATENT DOCUMENTS

DE 3623468 1/1987
DE 4336278 4/1996
(Continued)

OTHER PUBLICATIONS

German Search Report dated Jul. 9, 2015.

*Primary Examiner* — Hilary L Gutman
(74) *Attorney, Agent, or Firm* — Gerald E. Hespos; Michael J. Porco; Matthew T. Hespos

(57) ABSTRACT

A cover (9) of a folding-top compartment in a cabriolet vehicle can be pivoted by way of links (10, 10) between a position in which the cover (9) covers the folding-top compartment and a position in which the cover (9) does not cover the folding-top compartment. The cover (9) has, at a distance from its pivoting connection, at least one first guide element (15), and on the body, there is provided at least one second guide element (18). During the transfer of the cover (9) into its closed position, the two guide elements (15, 18) interact, and guide the cover (9), as far as the closed position.

10 Claims, 3 Drawing Sheets

(51) Int. Cl.
*B60J 7/12* (2006.01)
*B60J 7/185* (2006.01)
*B60J 7/19* (2006.01)

(58) Field of Classification Search
USPC .................................................. 296/136.06
See application file for complete search history.

(56) References Cited

U.S. PATENT DOCUMENTS

| | | | |
|---|---|---|---|
| 5,090,764 A | 2/1992 | Kogawa et al. | |
| 5,533,777 A | 7/1996 | Kleemann et al. | |
| 6,764,126 B2 | 7/2004 | Mentink et al. | |
| 6,866,327 B2* | 3/2005 | Willard | B60J 7/202 |
| | | | 296/107.08 |
| 7,178,852 B2 | 2/2007 | Obendiek | |
| 7,201,428 B2 | 4/2007 | Wagner | |
| 7,735,899 B2* | 6/2010 | Baumeier | B60J 7/205 |
| | | | 296/107.08 |
| 7,900,992 B2 | 3/2011 | Roeder | |
| 7,959,206 B2 | 6/2011 | Hinrichs | |
| 8,172,303 B2 | 5/2012 | Odoi | |
| 2002/0036413 A1 | 3/2002 | Neubrand | |
| 2002/0093218 A1* | 7/2002 | Weissmueller | B60J 7/205 |
| | | | 296/107.08 |
| 2002/0140250 A1 | 10/2002 | Hasselgruber | |
| 2003/0189355 A1 | 10/2003 | Hahn | |
| 2004/0061353 A1 | 4/2004 | Habacker | |
| 2005/0285428 A1* | 12/2005 | Dilluvio | B60J 7/205 |
| | | | 296/107.08 |
| 2006/0138800 A1 | 6/2006 | Bruder | |
| 2007/0029833 A1 | 2/2007 | Kuhr | |
| 2010/0066117 A1 | 3/2010 | Schmitt | |
| 2010/0186541 A1 | 7/2010 | Just | |
| 2010/0264685 A1 | 10/2010 | Neubrand | |
| 2011/0095560 A1 | 4/2011 | Schmitt | |
| 2012/0193937 A1 | 8/2012 | Armbruster | |

FOREIGN PATENT DOCUMENTS

| | | |
|---|---|---|
| DE | 10140233 | 3/2003 |
| DE | 102006052073 | 5/2008 |
| DE | 102008047490 | 4/2010 |
| DE | 102011015093 | 9/2012 |

* cited by examiner

ARRANGEMENT OF A COVER OF A FOLDING-TOP COMPARTMENT IN A CABRIOLET

CROSS REFERENCE TO RELATED APPLICATION

This application is a continuation-in-part of application Ser. No. 14/810,666, filed on Jul. 28, 2015, which in turn claimed priority under 35 USC 119 to German Patent Appl. No. 10 2014 110 828.0 filed on Jul. 30, 2014. The entire disclosure of application Ser. No. 14/810,666 is incorporated herein by reference.

BACKGROUND

1. Field of the Invention

The invention relates to the arrangement of a cover of a folding-top compartment in a cabriolet vehicle, wherein the cover can be pivoted by way of links between a position in which it covers the folding-top compartment and a position in which it does not cover the folding-top compartment.

2. Description of the Related Art

DE 10 2011 015 093 A1 discloses an arrangement of a cover of a folding-top compartment in a cabriolet vehicle. The cover can be pivoted by way of links between a position in which it covers the folding-top compartment and a position in which it does not cover the folding-top compartment. The folding top can be opened and closed when the cover does not cover the folding-top compartment. After the folding top has been opened or closed, the cover is transferred into its position in which it covers the folding-top compartment.

A rear end cover of a folding-top compartment of a cabriolet vehicle may be mounted pivotably by a four-bar mechanism. The four-bar mechanisms engage pivotably on both sides of the cover and at positions near the front of the cover. Thus, a large distance exists between the region of the pivotable mounting of the cover and the rear end of the cover, and there is the risk of that the rear end will be deformed in the closed position where the cover covers the folding-top compartment.

It is an object of the invention to provide a cover of a folding-top compartment in a cabriolet vehicle so that the cover is stable when in the position to cover the folding-top compartment, and so that there is no risk of the cover being deformed.

SUMMARY

The invention relates to a cover that is mounted pivotably and that also is guided at a distance from its pivoting connection. Thus, the cover has at least one first guide element at a distance from its pivoting connection. Furthermore, at least one second guide element is provided on the body. During the transfer of the cover into its closed position, the two guide elements interact, and guide the cover to the closed position.

The two guide elements interact during the transfer of the cover into its closed position and also during the movement of the cover out of the closed position.

Two first guide elements and two second guide elements may be provided. The guide elements are arranged on the right and left sides of the cover in relation to the forward direction of travel of the vehicle. Thus, guidance of the cover at both sides is realized during movement of the cover into and/or out of its closed position.

The arrangement of the first and second guide elements may be of particularly simple construction. For example, the guide elements may comprise a guide bolt or sliding block and a guide. The guide may be a guide groove. The guide bolt or sliding block and the guide groove ensure that the cover is guided positively during the transfer of the cover into and out of its closed position.

The guide bolt may be fixed to the cover and the guide may be fixedly connected to a folding-top bearing of the bodyshell.

To ensure optimum distortion-free guidance of the cover, at least one of the guide elements may be adjustable. For example, one guide element may be adjustable in an X-direction, and the other guide element may be adjustable in a Y-direction and a Z-direction. Here, again from the aspect of a particularly simple structural form, it is considered to be advantageous if the guide bolt is adjustable in an X-direction and the second guide element is adjustable in a Y-direction and a Z-direction. The second guide element may have locking bolts for selectively locking the second guide element in a fixed position on the respective side of the body of the vehicle. The locking bolts may be loosened to permit movement of the second guide element relative to the body of the vehicle. The second guide element may further comprise an adjustment screw that can be rotated to achieve controlled and precise movement of the second guide element relative to the body of the vehicle. The adjustment screw may be aligned vertically or in a Z-axis direction to achieve precise vertical or Z-direction movements to ensure accurate positioning of the cover at the opening of the folding top compartment. The properly positioned second guide element then can be locked in the proper position by tightening the locking bolts In this case, the X-direction is the direction of travel of the vehicle, and thus the longitudinal axis of the vehicle, the Y-direction is the transverse direction of the vehicle, and the Z-direction is the vertical direction of the vehicle.

In the closed position of the cover, the two guide elements may be arranged relative to one another so that one of the guide elements forms a stop for the other guide element in the event of a rear-end crash of the vehicle.

The transfer of the cover into its closed position precisely guides the cover at a distance from the pivoting region of the cover. In particular, a bolt may be provided on the cover. The bolt enters the guide before the closed position of the cover is reached and blocks a Z-movement of the tip of the cover and thus of that end of the cover that is remote from the pivoting region of the cover. Here, the cover also may be guided positively in the X-direction and Y-direction.

The design according to the invention has the advantage that the cover is positively guided during closing and preferably also during opening, and thus the influence of vibrations on the cover can be reduced. Moreover, the guide can prevent a forward displacement of the cover in the event of a rear-end crash.

Further features of the invention will emerge from the appended drawing and from the description of the preferred exemplary embodiment depicted in the drawing, without the invention being restricted to these.

DETAILED DESCRIPTION

Figure 1:
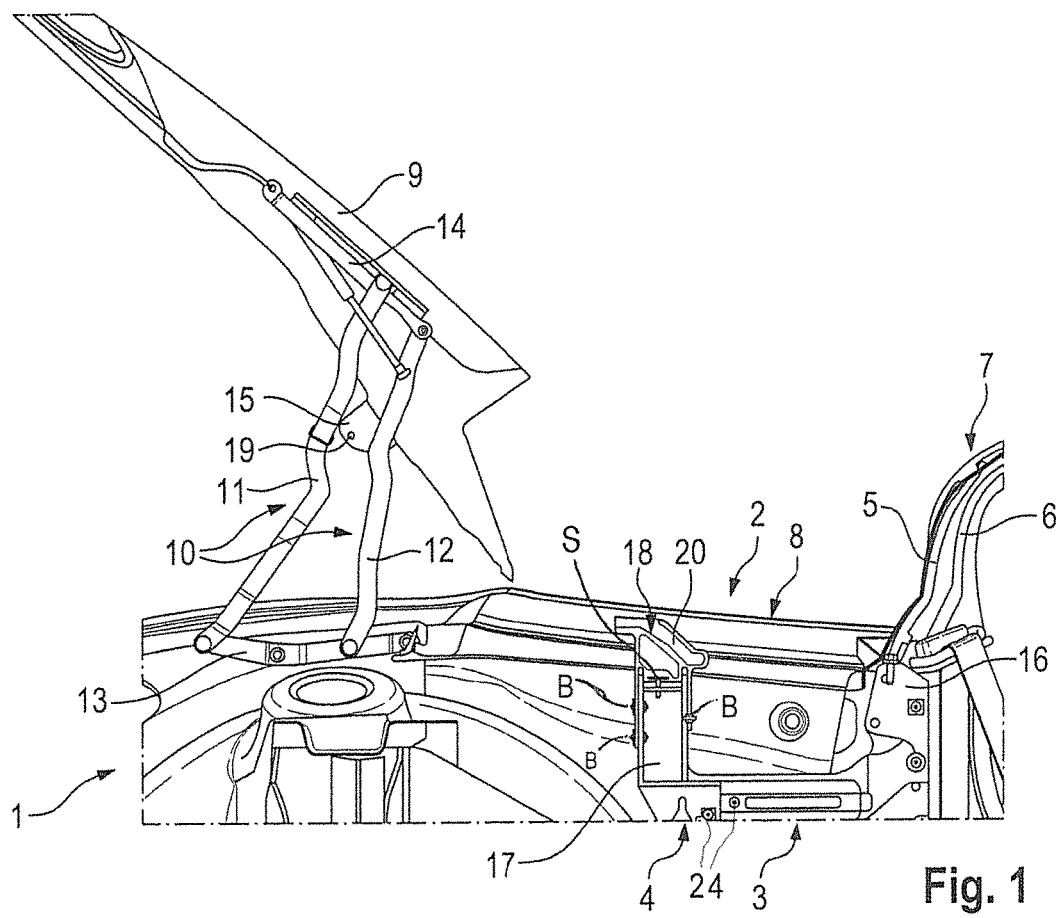
FIG. 1 is a longitudinal central section through a bodyshell of a cabriolet in the rear-end region thereof, specifically the upper region of the bodyshell, with the cover, which is mounted in said region, for closing a folding-top compartment, the illustration showing the fully open position of the cover.

FIG. 1 shows a vehicle bodyshell 1 of a cabriolet vehicle at a region 2 of the vehicle bodyshell 1 behind a folding top of the cabriolet. The region 2 of the vehicle bodyshell 1 has a compartment for accommodating a folding-top. FIG. 1 also shows a folding-top bearing 3 that is fixed with respect to the bodyshell and that has folding-top bearing parts 4 arranged on both the right and left sides of the vehicle body. The respective folding-top bearing part 4 holds two links 5, 6 of a folding top 7. When the links 5 and 6 pivot, the folding top 7 can be moved from the closed position into the open position and vice versa. In the open position, the folding top 7 is stowed in the folding-top compartment.

The folding-top compartment has an opening 8 formed in the upper region of the vehicle bodyshell 1 that can be covered by a cover 9 for the folding-top compartment. The cover 9 is arranged adjacent to the rear end of the vehicle and is shown in FIG. 1 in its fully open end position, in which the cover 9 uncovers the opening 8 and the folding-top compartment. The cover 9 is mounted in the vehicle bodyshell 1 on both sides by way of in each case one four-bar mechanism 10. The four-bar mechanism 10 makes it possible for the cover 9 to be pivoted and also to be moved from the fully open position in the rear-end region of the vehicle forward into the region above the opening 8 to close the opening 8.

Each four-bar mechanism 10 has two links 11 and 12. Lower regions of the links 11, 12 are mounted pivotably in a holder 13 that is screwed to the vehicle bodyshell 1. In the region of the upper ends, the links 11 and 12 likewise are connected pivotably to a holder 14, that is screwed to the cover 9.

The cover 9 has a guide element 15 at a distance from its pivoting connection to the four-bar mechanism 10 and on the respective side facing toward the four-bar mechanism 10. The respective folding-top bearing part 4 is U-shaped. In the region of one leg 16, the folding-top bearing part holds the links 5 and 6 in pivotable fashion, and in the region of the other leg 17, which is more closely adjacent to the rear end of the vehicle, the folding-top bearing part has a guide element 18 in the region of the free end of said leg 17. Thus, two guide elements 18 are provided on both sides of the vehicle bodyshell 1. During the transfer of the cover 9 into its closed position, the guide elements 15 and 18 arranged on the respective side of the vehicle bodyshell 1 interact, and guide the cover 9 to the closed position.

Figure 2:
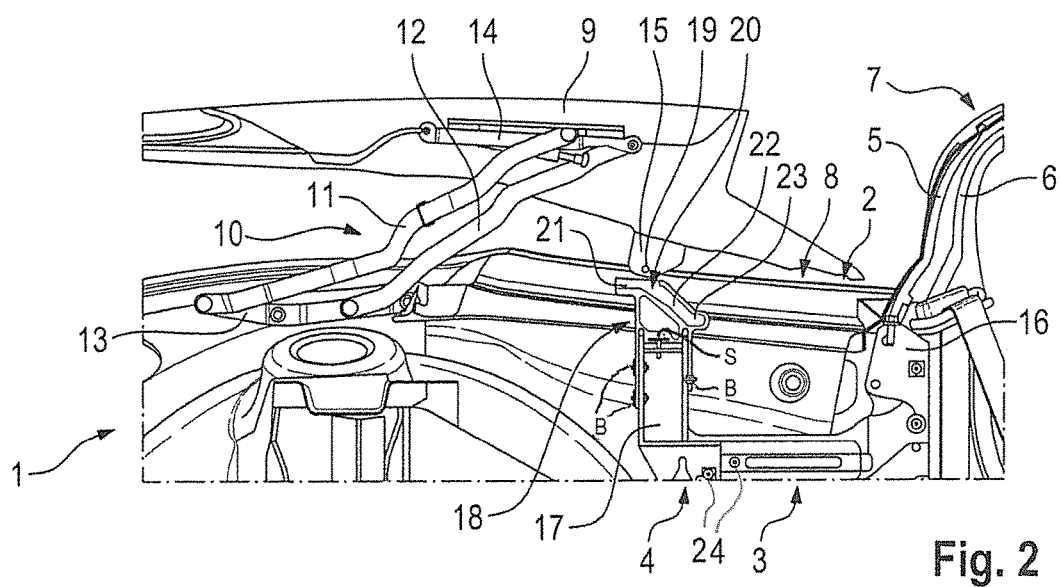
FIG. 2 shows the arrangement of FIG. 1 in a first intermediate position proceeding from the position of FIG. 1.
Figure 3:
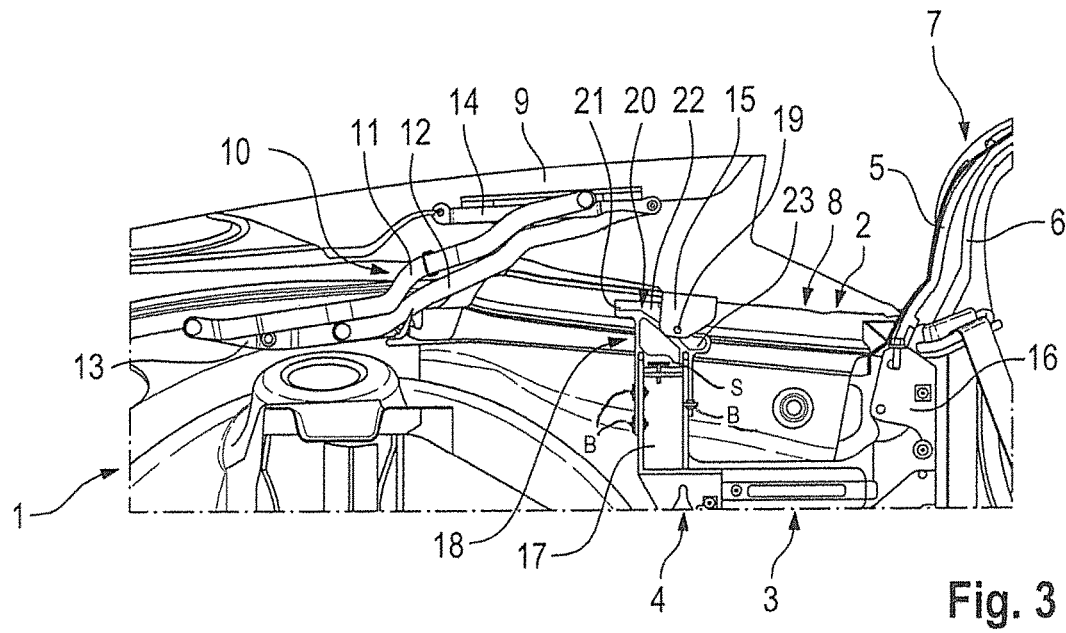
FIG. 3 shows the arrangement of FIG. 1 in a second intermediate position proceeding from the position of FIG. 1.
Figure 4:
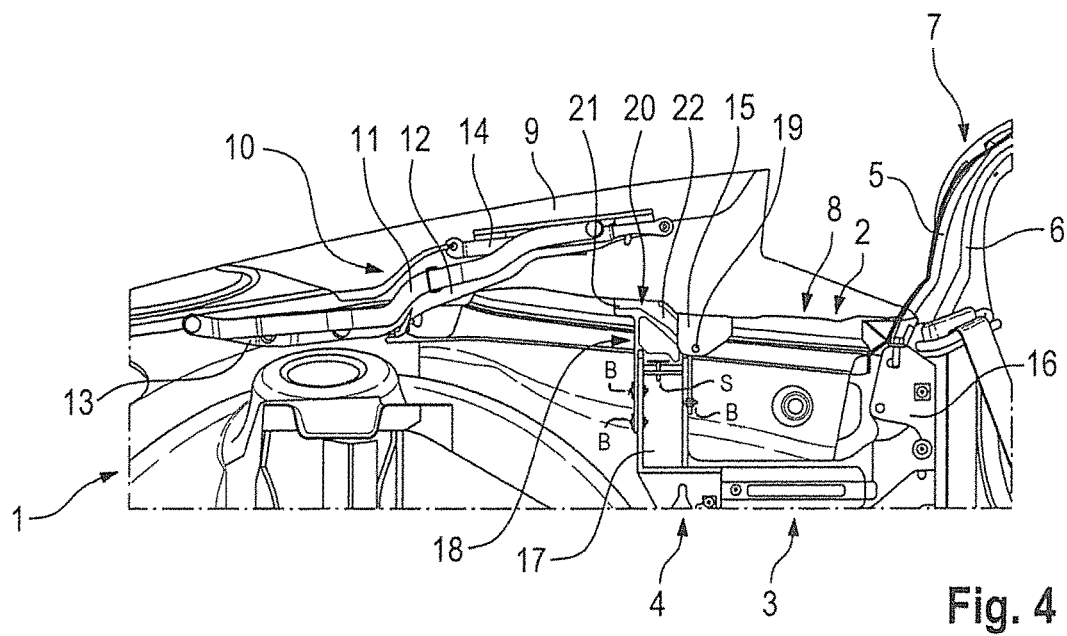
FIG. 4 shows the arrangement of FIG. 1, with the illustration showing the closed position of the cover.
Figure 6:
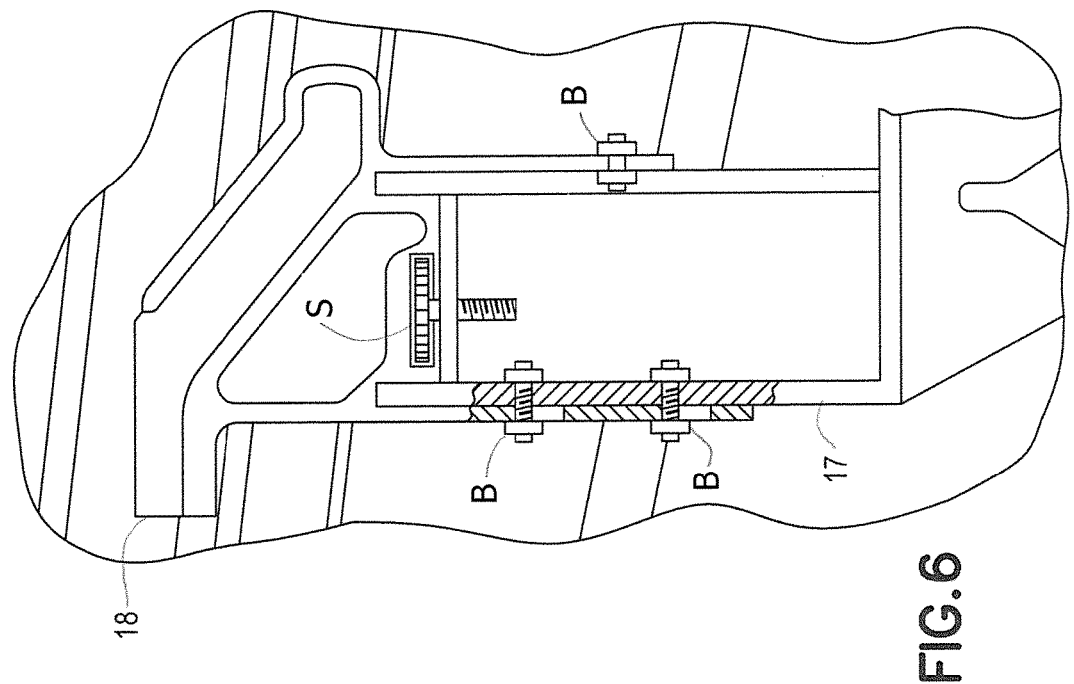
FIG. 6 shows the guide element of FIG. 5 adjusted into a lower position on the body of the vehicle and then fixed in that lower position.
Figure 5:
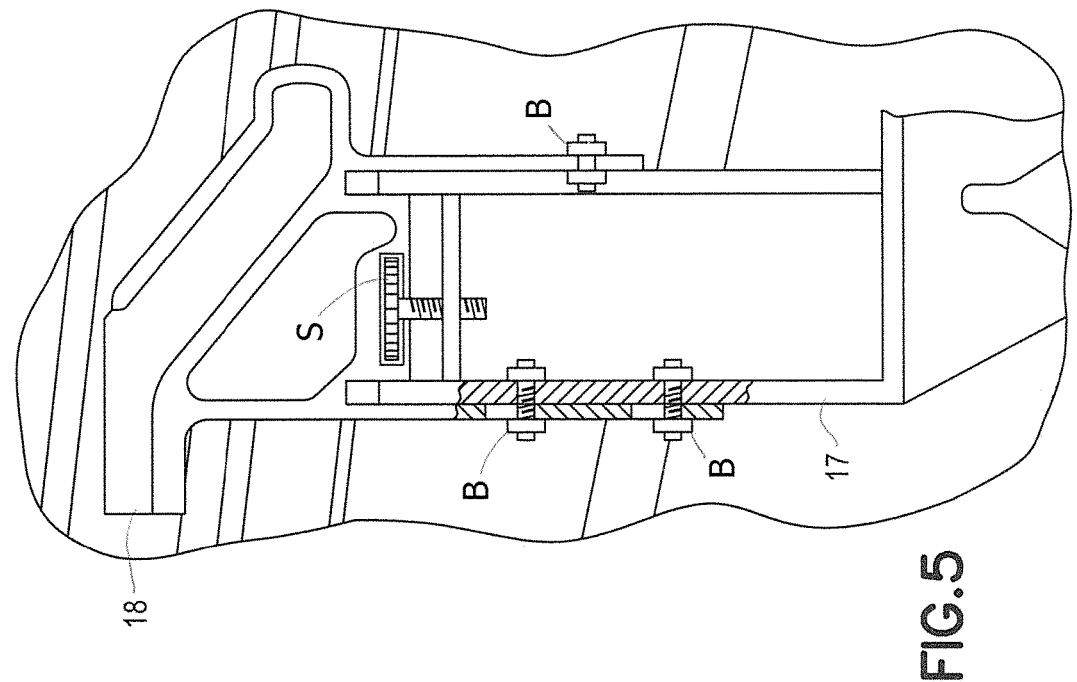
FIG. 5 shows the guide element that receives the bolt of the cover when the guide element is adjusted into an upper position on the body of the vehicle and then fixed to the body in that upper position.

FIGS. 1 to 4 show the arrangement proceeding from the open position of the cover 9 of FIG. 1, the adjoining intermediate positions of FIGS. 2 and 3, and the closed position of the cover 9 of FIG. 4. The sequence of figures shows the interaction of the guide elements 15 and 18:

The guide element 15 has a bolt 19 arranged parallel to the pivot axes of the cover 9. The bolt 19 is guided in a guide groove 20 in the guide element 18 from shortly before the closed position of the cover 9 is reached until the closed position of the cover 9 is reached. The guide groove 20 has a substantially horizontal first section 21, a second section 22 that runs at an obtuse angle to the first section 21, and a third section 23 that is extremely short and runs horizontally. The first section 21 is open up, so that, as can be seen in FIG. 2, the bolt 19 on the respective side of the cover 9 can enter the guide groove 20 assigned to the bolt 19 of the guide element 18. During the further pivoting of the cover 9 in the closing direction, the bolt 19 enters the second section 22 of the guide groove 20 and thus is guided in an X-direction and a Z-direction, furthermore in a Z-direction, as the bolt 19 bears against the base of the guide groove 20 or is positioned with only a small degree of play with respect to the base of the guide groove 20. When the cover 9 has been moved into its closed position, and thus the folding-top compartment is completely covered, the bolt 19 is in the front region of the third section 23 of the guide groove 20. In the event of a rear-end collision with introduction of a force into the cover 9, the two guide elements 18 support and fix the cover 9 to prevent the cover 9 from being displaced forward.

The bolt 19 is adjustable in an X-direction and the guide element 18, and thus the guide groove 20, are adjustable in a Y-direction and in a Z-direction. For example, locking bolts B extend horizontally through the guide element 18 and the leg 17 and can be loosened to permit height adjustments of the guide element 18 in the Z-direction relative to the leg 17. An adjustment screw or set screw S is aligned vertically and has a threaded shank that is engaged threadedly in a threaded vertically aligned aperture in the leg 17. A head of the adjustment or set screw S is trapped in a slot in the guide element 18. Thus, rotation of the set screw S causes a vertical movement of the set screw S up or down relative to the leg 17 depending on the direction of rotation, and causes a corresponding up or down vertical movement of the guide element 18 toward or away from the opening 8 of the compartment due to the trapped engagement of the head of the set screw 18 in the slot of the guide element 18. The locking bolts B then can be tightened to fix the guide element 18 at a height position relative to the leg 17 to achieve proper engagement of the bolt 19 in the corresponding guide groove 20.

The position of the closed cover in the Y-axis direction also can be adjusted to ensure an accurate positioning of the cover 9 over the folding top compartment. In this regard, the adjustment screws 24 can be adjusted to move the folding top bearing 3 laterally or in the Y-axis direction with respect to a part of the bodyshell 1 that defines a lateral side of the folding top compartment To prevent deformations of the cover 9, an additional sliding guide is thus implemented in the cabriolet. Said sliding guide is fitted to the vehicle on the left and on the right. The bolt 19 or a sliding block is fixed to the cover 9 and, during the closing of the cover 9, engages into the corresponding guide groove 20 and is guided therein as far as the end position of the cover 9. This has the advantage that the cover 9 is positively guided during the opening and/or closing processes and thus the influence of vibrations can be reduced. Furthermore, the guide can prevent a forward displacement of the cover 9 in the event of a rear-end crash.

LIST OF REFERENCE NUMERALS

1 Vehicle bodyshell
2 Region with folding top compartment
3 Folding-top bearing
4 Folding-top bearing part
5 Link
6 Link
7 Folding top
8 Opening
9 Cover
10 Four-bar mechanism
11 Link
12 Link
13 Holder
14 Holder
15 Guide element
16 Leg
17 Leg
18 Guide element
19 Bolt
20 Guide groove
21 Section
22 Section
23 Section
24 Adjustment screws
B Locking bolt
S Set screw

What is claimed is:

1. A cover arrangement for a folding-top compartment in a body of a cabriolet vehicle, comprising:
    folding top bearing parts mounted to the body of the cabriolet vehicle at positions in the folding-top compartment;
    folding top links pivotally mounted to the folding top bearing parts and to a folding top of the cabriolet vehicle for selectively moving the folding top into or out of the folding-top compartment;
    a cover having opposite front and rear ends and being configured for covering the folding-top compartment;
    a plurality of rigid cover links, each of the cover links having a lower end pivotally connected to the body of the vehicle and an upper end pivotally connected to the cover at a location closer to the front end of the cover than to the rear end of the cover, the cover links being configured so that pivoting movement of the cover links moves the cover between a closed position in which the cover covers the folding-top compartment and an open position in which the cover does not cover the folding-top compartment and so that the front end of the cover is lower than the rear end of the cover when the cover is in the open position;
    at least one guide projection at a location on the cover spaced from the pivotal connection of the cover links to the cover; and
    at least one guide groove non-pivotally disposed at fixable positions on the folding top bearing parts forward of the pivoting connection of the cover links to the body, the at least one guide groove having a first section with an upward opening disposed and configured for receiving the at least one guide projection as the cover moves toward the closed position, the at least one guide groove further having a second section angularly aligned to the first section and configured for guiding the cover farther toward the closed position.

2. The cover arrangement of claim 1, wherein the at least one guide projection comprises two guide projections and the at least one guide groove comprises two guide grooves, wherein the two guide projections are arranged at right and left sides of the cover in relation to a forward direction of travel of the vehicle.

3. The cover arrangement of claim 1, wherein the at least one guide projection is a guide bolt or sliding block.

4. The cover arrangement of claim 1, wherein a distance from the front end of the cover to the guide projection is less than a distance from the front end of the cover to any of the pivotal connections of the cover links to the cover.

5. The cover arrangement of claim 1, wherein the at least one cover link is connected pivotally to the cover at a location that is in a vertical plane that passes through a portion of the at least one guide groove when the cover is in the closed position.

6. The cover arrangement of claim 1, wherein the first section of the at least one guide groove extends substantially horizontally and the second section of the at least one guide groove extends obliquely down from the first section thereof.

7. The cover arrangement of claim 6, wherein the at least one guide groove further has a third section that extends substantially horizontally from an end of the second section remote from the first section thereof to a front end of the guide groove, the front end of the guide groove defining a closed stop for limiting forward movement of the cover.

8. The cover arrangement of claim 1, wherein the at least one guide groove is vertically adjustable on the folding top bearing parts.

9. The cover arrangement of claim 1, wherein the at least one guide groove is formed in a guide element that is selectively movable relative to the folding top bearing parts, locking bolts selectively engaged with the guide element and the folding top bearing parts for fixing the guide element at a selected height position on the folding top bearing parts, and a set screw threadedly engaged in the folding top bearing parts and rotatably trapped in a slot of the guide element so that rotation of the set screw moves the guide element vertically with respect to the folding top bearing parts.

10. The cover arrangement of claim 9, further comprising adjusting screws securing the guide element to the vehicle adjustably in a lateral direction of the vehicle.

* * * * *